(12) United States Patent
Hanov et al.

(10) Patent No.: US 11,358,737 B2
(45) Date of Patent: Jun. 14, 2022

(54) METHODS AND SYSTEMS FOR PERFORMING AIRCRAFT MAINTENANCE

(71) Applicant: The Boeing Company, Chicago, IL (US)

(72) Inventors: Nile Hanov, Irvine, CA (US); James M. Ethington, St. Charles, MO (US); Jason M. Keller, Des Peres, MO (US)

(73) Assignee: The Boeing Company, Chicago, IL (US)

( * ) Notice: Subject to any disclaimer, the term of this patent is extended or adjusted under 35 U.S.C. 154(b) by 850 days.

(21) Appl. No.: 16/213,136

(22) Filed: Dec. 7, 2018

(65) Prior Publication Data

US 2020/0180788 A1 Jun. 11, 2020

(51) Int. Cl.
*B64F 5/60* (2017.01)
*G06F 16/23* (2019.01)
*G06N 20/00* (2019.01)
*G07C 5/00* (2006.01)
*G07C 5/08* (2006.01)

(52) U.S. Cl.
CPC ............ *B64F 5/60* (2017.01); *G06F 16/2379* (2019.01); *G06N 20/00* (2019.01); *G07C 5/008* (2013.01); *G07C 5/0808* (2013.01)

(58) Field of Classification Search
CPC ....... B64F 5/60; G06F 16/2379; G06N 20/00; G07C 5/008; G07C 5/0808
USPC ........................................................ 701/29.4
See application file for complete search history.

(56) References Cited

U.S. PATENT DOCUMENTS 8,521,448 B1 8/2013 Ung et al.
10,706,361 B1 * 7/2020 Ethington ................ G06N 5/04
(Continued)

FOREIGN PATENT DOCUMENTS

EP 2 570 880 3/2013
EP 3 260 943 12/2017
WO WO 2017/069825 4/2017

OTHER PUBLICATIONS

Extended European Search Report prepared by the European Patent Office in application EP 19 21 1248.0 dated Apr. 29, 2020.

*Primary Examiner* — Gertrude Arthur Jeanglaude
(74) *Attorney, Agent, or Firm* — McDonnell Boehnen Hulbert & Bergnoff LLP

(57) ABSTRACT

In an example, a method for determining whether to perform aircraft maintenance is described. The method comprises selecting groupings of sensors and/or parameters associated with an aircraft type. The method comprises receiving feature data that corresponds to each grouping of sensors and/or parameters. The method comprises determining, from the feature data, values for predetermined operational metrics. The method comprises comparing the values to values for predetermined operational metrics that correspond to at least one other flight of the aircraft. The method comprises determining, based on comparing the values for the predetermined operational metrics, values of additional operational metrics. The method comprises training a machine learning model using at least the values for the additional operational metrics. The method comprises providing, based on an output of the machine learning model, an instruction to perform maintenance on one or more of the plurality of portions of the aircraft or another aircraft.

20 Claims, 12 Drawing Sheets

(56) References Cited

U.S. PATENT DOCUMENTS

2016/0107768 A1* 4/2016 Nicks ................ G05B 23/0283
      702/183
2017/0369190 A1 12/2017 Ethington et al.
2018/0288080 A1 10/2018 Keller et al.

* cited by examiner

300

Flight 001:

| Tail # | Time (s) | Left Aileron Position | Right Aileron Position |
|---|---|---|---|
| 10001 | 0.1 | 0.16 | 0.1 |
| 10001 | 0.2 | 0.17 | 0.11 |
| 10001 | 0.3 | 0.16 | 0.13 |
| 10001 | 0.4 | 0.15 | 0.14 |
| 10001 | 0.5 | 0.14 | 0.13 |
| 10001 | ... | ... | ... |
| 10001 | 3911.8 | 0.11 | 0.11 |
| 10001 | 3911.9 | 0.12 | 0.11 |

Flight 002:

| Tail # | Time (s) | Left Aileron Position | Right Aileron Position |
|---|---|---|---|
| 10001 | 0.1 | 0.17 | 0.11 |
| 10001 | 0.2 | 0.18 | 0.22 |
| 10001 | 0.3 | 0.17 | 0.15 |
| 10001 | 0.4 | 0.16 | 0.18 |
| 10001 | 0.5 | 0.15 | 0.16 |
| 10001 | ... | ... | ... |
| 10001 | 3348.1 | 0.12 | 0.16 |
| 10001 | 3348.2 | 0.15 | 0.12 |

Other Flights for Tail #10001 and Tail #10002

| ... | ... | ... | ... | ... |

FIG. 3

Predetermined Operational Metrics

| Tail # | Flight # | Left_Right_Aileron_Position_Difference_MIN | Left_Right_Aileron_Position_Difference_MAX | Left_Right_Aileron_Position_Difference_AVE | ⋮ |
|---|---|---|---|---|---|
| 10001 | 001 | 0.01 | 0.06 | 0.0250 | ⋮ |
| 10001 | 002 | 0.0 | 0.07 | 0.0258 | ⋮ |
| 10002 | 001 | 0.01 | 0.07 | 0.0282 | ⋮ |
| ⋮ | ⋮ | ⋮ | ⋮ | ⋮ | |
| 10002 | 004 | 0.02 | 0.08 | 0.0310 | ⋮ |
| ⋮ | ⋮ | ⋮ | ⋮ | ⋮ | |

Additional Operational Metrics

| Tail # | Left_Right_Aileron_Pos_Diff_MIN_AVG | Left_Right_Aileron_Pos_Diff_MIN_MAX | Left_Right_Aileron_Pos_Diff_MAX_AVG | Left_Right_Aileron_Pos_Diff_AVG_MAX |
|---|---|---|---|---|
| 10001 | 0.005 | 0.01 | 0.065 | 0.0258 |
| 10002 | 0.008 | 0.02 | 0.075 | 0.0310 |
| ⋮ | ⋮ | ⋮ | ⋮ | ⋮ |

FIG. 4

METHODS AND SYSTEMS FOR PERFORMING AIRCRAFT MAINTENANCE

FIELD

The present disclosure relates generally to operation of an aircraft, and more particularly, to methods and systems for performing maintenance on an aircraft.

BACKGROUND

An aircraft or an airplane needs consistent maintenance and is subject to regular testing. To determine whether aspects of an aircraft require maintenance, a human may perform a physical check of the aircraft or review in-flight sensor data from the aircraft to determine whether the aircraft is performing normally as compared to specified requirements. The sensor data can be indicative of pitch, roll, yaw, or other in-flight characteristics of the aircraft.

Existing methods for determining whether an aircraft needs maintenance may require extensive time and effort for a human inspector. Further, existing methods may take sensor data into account to assess the performance of an aircraft as a whole, but without determining a specific portion of the aircraft that requires maintenance, such as the wings, ailerons, fuselage, stabilizers, etc. In such scenarios, even where it is determined that the aircraft requires maintenance, additional time and consideration is required to determine which discrete portions of the aircraft require maintenance. These issues impact the cost and reliability of performing aircraft maintenance.

What is needed is a method and/or system that takes different sensor data into account with respect to operationally distinct portions of an aircraft to provide an accurate determination that one or more portions of the aircraft requires maintenance.

SUMMARY

In an example, a method for determining whether to perform aircraft maintenance is described. The method comprises selecting, from a plurality of sensors and parameters associated with an aircraft type, based on expected in-flight forces to be experienced by a plurality of operationally distinct portions of the aircraft type, a plurality of groupings of sensors and/or parameters that correspond to the plurality of portions of the aircraft type. The method further comprises receiving, from an aircraft of the aircraft type, feature data that corresponds to each grouping of sensors and/or parameters. The method also comprises determining, by a computing system, from the feature data, values for predetermined operational metrics that correspond to the plurality of groupings of sensors and/or parameters, wherein the values for the predetermined operational metrics are indicative of responses of the aircraft to forces experienced by each respective portion of the aircraft that corresponds to a selected grouping of sensors and/or parameters during a given flight of the aircraft. The method additionally comprises comparing, by the computing system, the values for the predetermined operational metrics to values for the predetermined operational metrics that correspond to at least one other flight of the aircraft. The method still further comprises determining, by the computing system, based on comparing the values for the predetermined operational metrics, values of additional operational metrics, wherein the values of the additional operational metrics are indicative of responses of the aircraft to forces experienced by each respective portion of the aircraft that corresponds to a selected grouping of sensors and/or parameters during multiple flights of the aircraft. The method also comprises training a machine learning model using at least the values for the additional operational metrics. The method also comprises providing, by the computing system, based on an output of the machine learning model, an instruction to perform maintenance on one or more of the plurality of portions of the aircraft or another aircraft of the aircraft type.

In another example, a system for determining whether to perform aircraft maintenance is described. The system comprises a computing device having a processor and memory storing instructions executable by the processor to select, from a plurality of sensors and parameters associated with an aircraft type, based on expected in-flight forces to be experienced by a plurality of operationally distinct portions of the aircraft type, a plurality of groupings of sensors and/or parameters that correspond to the plurality of portions of the aircraft type. The instructions are also executable by the processor to receive, from an aircraft of the aircraft type, feature data that corresponds to each grouping of sensors and/or parameters. The instructions are further executable by the processor to determine, from the feature data, values for predetermined operational metrics that correspond to the plurality of groupings of sensors and/or parameters, wherein the values for the predetermined operational metrics are indicative of responses of the aircraft to forces experienced by each respective portion of the aircraft that corresponds to a selected grouping of sensors and/or parameters during a given flight of the aircraft. The instructions are still further executable by the processor to compare the values for the predetermined operational metrics to values for the predetermined operational metrics that correspond to at least one other flight of the aircraft. The instructions are additionally executable by the processor to determine based on comparing the values for the predetermined operational metrics, values of additional operational metrics, wherein the values of the additional operational metrics are indicative of responses of the aircraft to forces experienced by each respective portion of the aircraft that corresponds to a selected grouping of sensors and/or parameters during multiple flights of the aircraft. The instructions are also executable by the processor to train a machine learning model using at least the values for the additional operational metrics. The instructions also executable by the processor to provide, based on an output of the machine learning model, an instruction to perform maintenance on one or more of the plurality of portions of the aircraft or another aircraft of the aircraft type.

In another example, a non-transitory computer readable medium is described. The non-transitory computer readable medium has stored thereon instructions, that when executed by one or more processors of a computing device, cause the computing device to perform functions. The functions comprise selecting, from a plurality of sensors and parameters associated with an aircraft type, based on expected in-flight forces to be experienced by a plurality of operationally distinct portions of the aircraft type, a plurality of groupings of sensors and/or parameters that correspond to the plurality of portions of the aircraft type. The functions also comprise receiving, from an aircraft of the aircraft type, feature data that corresponds to each grouping of sensors and/or parameters. The functions further comprise determining, from the feature data, values for predetermined operational metrics that correspond to the plurality of groupings of sensors and/or parameters, wherein the values for the predetermined operational metrics are indicative of responses of the aircraft to forces experienced by each respective portion of the aircraft that corresponds to a selected grouping of sensors and/or parameters during a given flight of the aircraft. The functions still further comprise comparing, the values for the predetermined operational metrics to values for the predetermined operational metrics that correspond to at least one other flight of the aircraft. The functions additionally comprise determining, based on comparing the values for the predetermined operational metrics, values of additional operational metrics, wherein the values of the additional operational metrics are indicative of responses of the aircraft to forces experienced by each respective portion of the aircraft that corresponds to a selected grouping of sensors and/or parameters during multiple flights of the aircraft. The functions also comprise training a machine learning model using at least the values for the additional operational metrics. The functions also comprise providing, based on an output of the machine learning model, an instruction to perform maintenance on one or more of the plurality of portions of the aircraft or another aircraft of the aircraft type.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 3 depicts exemplary feature data associated with a portion of an aircraft, according to an example implementation.

FIG. 4 depicts exemplary predetermined operational metrics and additional operational metrics associated with a portion of an aircraft, according to an example implementation.

DETAILED DESCRIPTION

Figure 1:
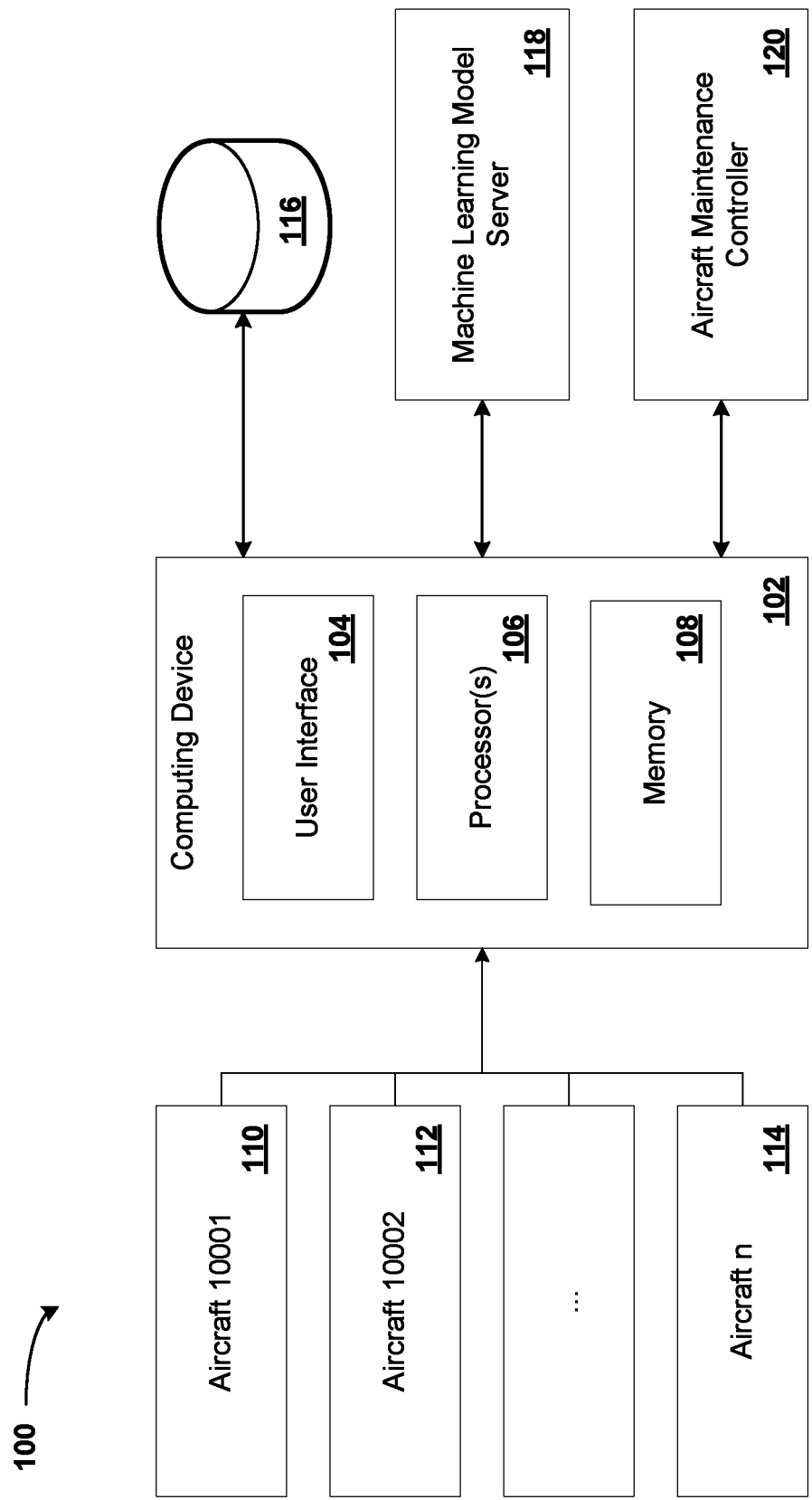
FIG. 1 illustrates a block diagram of an example system for determining whether to perform aircraft maintenance, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples, methods and systems for determining whether to perform aircraft maintenance are described. More specifically, systems and methods that use sets of sensors and/or parameters that are tailored to operationally distinct portions of an aircraft to determine whether to perform maintenance on the aircraft are described. More specifically, methods and systems that train a machine learning model using metrics associated with the groupings of sensors and/or parameters to determine whether to perform maintenance on the aircraft are described.

Example methods and systems involve tailoring how a machine learning model is trained to efficiently and accurately determine which portion or portions of an aircraft require maintenance. In one example, groupings of sensors and/or parameters are selected that correspond to operationally distinct portions of an aircraft. The groupings of sensors and/or parameters may correspond to unique forces experienced by, or functions performed by, each respective portion of the aircraft. Training the machine learning model based on these groupings may allow the model to provide targeted maintenance outputs, and to more accurately make such determinations.

Example methods and systems involve receiving feature data that corresponds to each respective grouping. In one example, values for predetermined operational metrics are determined from the sensor data. The predetermined operational metrics may include specific data points determined to correspond to a level of performance of one or more portions of the aircraft during a particular flight. The values for the predetermined operational metrics can be compared to values from previous flights to determine additional operational metrics. The additional operational metrics may include maximum values, minimum values, and average values of the compared values between multiple flights. These values can be used to train the machine learning model. By using a subset of values from the received feature data, the machine learning model can determine which, if any, portions of the aircraft require maintenance using less computing power than would otherwise be required. Further, using the additional operational metrics, which are indicative of responses of the aircraft to forces experienced by each respective portion of the aircraft during multiple flights of the same aircraft, the machine learning model can produce outputs that are more likely accurate and that are tailored to unique operational qualities of the aircraft.

Examples described herein are for aircraft. However, methods and systems may also be used for other vehicles to assist with determining maintenance needs of other vehicles.

Implementations of this disclosure provide technological improvements that are particular to aircraft maintenance systems, for example, those concerning determining whether to perform maintenance on a given aircraft. Aircraft maintenance-specific technological problems, such as efficiently and consistently identifying when aircraft require maintenance, can be wholly or partially solved by implementations of this disclosure. For example, implementation of this disclosure reduces the amount of data required to train a machine learning model by using values associated with predetermined operational metrics and additional operational metrics to train the machine learning model, rather than the entirety of data received from a given aircraft. Further, by grouping sensors and/or parameters in accordance with operationally distinct portions of an aircraft type, implementations of this disclosure allow for flexible and targeted determinations of the need for aircraft maintenance. Further, grouping the sensors and/or parameters may reduce the amount of data to be transferred between an aircraft and a computing system associated with the machine learning model, and thus reduce time and increase efficiency in training the model. Implementations of this disclosure can thus introduce new and efficient improvements in the ways in which aircraft are maintained by selectively determining which data to use in training the machine learning model.

Referring now to the figures, FIG. 1 illustrates a block diagram of an example of a system 100 for determining whether to perform aircraft maintenance, according to an example implementation. In the depicted example, system 100 includes a computing device 102, a plurality of aircraft including aircraft 110, aircraft 112, and aircraft 114 (though more or fewer aircraft might be included in system 100), a database 116, a machine learning model server 118, and an aircraft maintenance controller 120.

System 100 can be a computing system that includes one or more computing devices, such as computing device 102. In examples, computing device 102 includes a user interface 104, processor(s) 106, and a memory 108.

User interface 104 may include a physical interface such as a mouse and keyboard, touchscreen, or other interactive interface, a virtual interface such as a web browser, application interface, virtual machine interface, or the like, or any other apparatus configured to receive input from a human user and transmit that input to a processor.

Memory 108 may include or take the form of one or more computer-readable storage media that can be read or accessed by processor(s) 106. The computer-readable storage media can include volatile and/or non-volatile storage components, such as optical, magnetic, organic or other memory or disc storage, which can be integrated in whole or in part with processor(s) 106. Memory 108 is considered non-transitory computer readable media. In some examples, memory 108 can be implemented using a single physical device (e.g., one optical, magnetic, organic or other memory or disc storage unit), while in other examples, memory 108 can be implemented using two or more physical devices. Memory 108 thus is a non-transitory computer readable storage medium, and executable instructions are stored thereon. The instructions include computer executable code.

Processor(s) 106 may be general-purpose processors or special purpose processors (e.g., digital signal processors, application specific integrated circuits, etc.). Processor(s) 106 may receive inputs from one or more of aircraft 110, 112, 114, or other aircraft in the plurality of aircraft, and process the inputs to generate feature data that is stored in memory 108. In some examples, processing the inputs from the aircraft by processor(s) 106 can include receiving raw data from each aircraft and assigning corresponding values to that data, assigning timestamps to data as it is received, and/or sending the received raw data to particular portions of memory 108. Processor(s) 106 can be configured to execute the executable instructions (e.g., computer-readable program instructions) that are stored in memory 108 and are executable to provide the functionality of computing device 102, and related systems and methods described herein.

In examples, the plurality of aircraft can include one or more aircraft types. Each aircraft type can be a unique make and model of aircraft. Computing device 102 can provide, by way of user interface 104, an option to select an aircraft type and to select groupings of sensors and/or parameters corresponding to operationally distinct portions of the aircraft. For instance, the groupings of sensors and/or parameters may be associated with forces experienced by, or functions performed by, the cockpit, fuselage, wings, nacelles, ailerons, flaps, slats, winglets, stabilizers, elevators, runners, or other operationally distinct portions of an aircraft, as described further below.

In some examples, computing device 102 may automatically select groupings of sensors and/or parameters based on schematics, design documents, circuit diagrams, or the like associated with a given aircraft type. Such information may be stored in memory 108. In such examples, computing device 102 may receive an indication of an aircraft type by way of user interface 104, and execute instructions stored on memory 108 to determine which sensors and/or parameters are associated with each portion of an aircraft in a predetermined list of portions of the aircraft type. Computing device 102 may present these groupings as suggestions to a user by way of the user interface 104, or may automatically select the groupings.

Once groupings of sensors and/or parameters are selected, computing device 102 can receive feature data from the plurality of aircraft over one or more flights. The feature data may be a subset of data logged by an aircraft during flight that corresponds to sensors and/or parameters in the selected groupings. In some examples, receiving the feature data may occur without prompting. That is, each aircraft may automatically send data to computing device 102, perhaps via a proxy server or other another computing device, at the conclusion of each flight. Computing device 102 can then determine the feature data from the data received from the aircraft. Otherwise, computing device 102 may query a given aircraft at a schedule flight conclusion time for particular data that corresponds to the groupings of sensors and/or parameters, and responsively receive the feature data from the aircraft.

Upon receiving the feature data, computing device 102 may send some or all of the data to database 116, along with an aircraft identifier, a flight identifier, and instructions that control where and how the data is stored within database 116. In some examples, computing device 102 might only send a subset of the feature data that includes values for predetermined operational metrics to database 116, along with an instruction to send similar values from previous flights of the same aircraft, and/or from aircraft of the same aircraft type as the aircraft, to computing device 102. Processes for determining the predetermined operational metrics are explained in further detail below.

Computing device 102 may compare values for predetermined operational metrics from previous flights to those received from a given aircraft in a most recent flight of the given aircraft. Based on comparing these values, computing device 102 may determine values for additional operational metrics that are indicative of responses to the aircraft to forces experienced during multiple flights. For instance, based on comparing the values for the predetermined operational metrics from the multiple flights, computing device 102 may determine overall minimum values, maximum values, and average values of the predetermined operational metrics.

Computing device 102 may use the values for the additional operational metrics to train a machine learning model. A machine learning model can be a random forest model, support vector machine (SVM), a neural network, or any other type of algorithm that uses machine learning. Machine learning may generally relate to computer assisted processing of inputs that uses statistical techniques to automatically improve task performance in the classification of data sets. Machine learning may include supervised learning, where the sample, historical data is labeled with the appropriate classification. In this case the supervised algorithm mathematically optimizes equations that separate the data by the corresponding label. Unsupervised training, where, by contrast, desired outputs are not provided when training the model can be used to identify hypothesized labels through various clustering techniques, with the ultimate goal of preparing data for supervised training. The machine learned models are stored in the machine learning model server 118. In examples, computing device 102 may provide the values, consisting of newly generated data, for the additional operational metrics as inputs to one or more machine learning models stored on machine learning model server 118. Machine learning model server 118 may be a plurality of computing devices, processors, and/or server clusters configured to run one or more machine learning models.

Having been trained, the machine learning model can be executed to evaluate performance of operationally distinct portions of aircraft during testing. Computing device 102 may provide test data from a given aircraft, which may include data logged by the aircraft during flight. For example, computing device 102 may provide data similar to that used to train the machine learning model. The machine learning model may be executed to provide an output based on receiving the test data. Computing device 102 may receive the output from the machine learning model. The output of the machine learning model might be a binary indication that a portion of the aircraft requires maintenance or does not require maintenance. Based on the binary indication, computing device 102 may provide an instruction to aircraft maintenance controller 120 to cause or schedule a given portion of the aircraft to be maintained. For example, aircraft maintenance controller 120 might be a management system of a remote maintenance facility that schedules maintenance and storage of aircraft, and may include a server associated with an aircraft maintenance facility.

In other examples, the output received from the machine learning model may include a performance rating for each portion of the aircraft for which an input was provided to the machine learning model. The performance rating may indicate how closely the inputs to the machine learning model match expected or desired values for the inputs. Computing device 102 can determine whether to perform maintenance on a given portion of the aircraft by comparing the received performance rating of the aircraft to a performance rating threshold. The threshold may indicate a percentage that shows how closely the additional operational metrics match expected values for those metrics. The expected values might be based on simulated flight data, on data received from one or more maintained aircraft, or on outputs generated by the machine learning model.

In examples, computing device 102 may provide same or similar metrics to a plurality of machine learning models, such as random forest models, SVMs, and neural networks, and receive outputs from each. In this fashion, computing device 102 may receive a plurality of outputs from the machine learning models, each of which indicate whether maintenance should be performed. Receiving outputs from multiple machine learning models may advantageously allow for redundancy and corroboration of decisions to perform maintenance.

Figure 2:
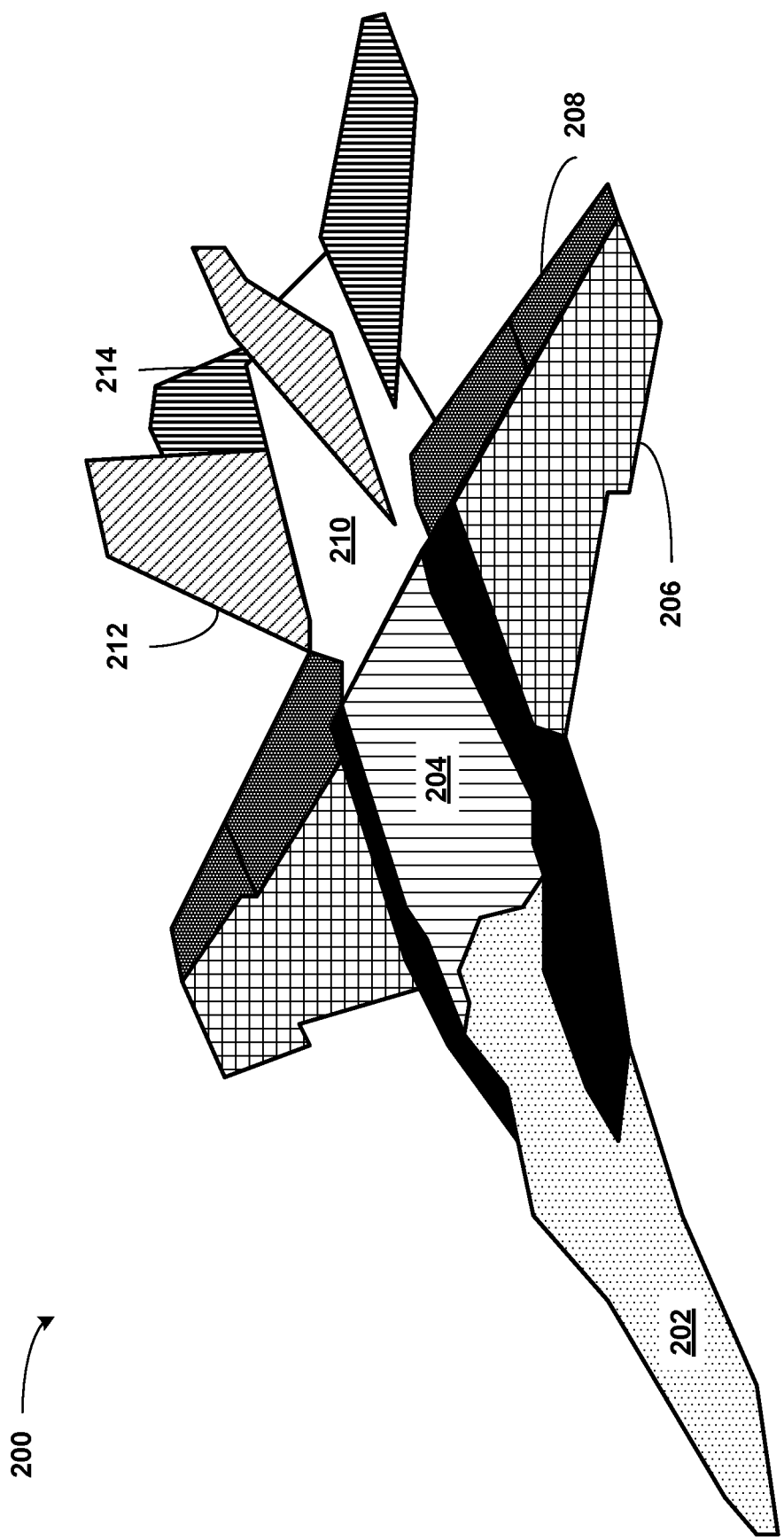
FIG. 2 is an example illustration of an aircraft with operationally distinct portions, according to an example implementation.

FIG. 2 is an example illustration of an aircraft 200 with operationally distinct portions. In the depicted example, aircraft 200 includes at least a forward fuselage 202, center fuselage 204, wings 206, ailerons/flaps 208, aft fuselage 210, vertical stabilizers 212, and horizontal stabilizers 214. Aircraft 200 may be of a particular aircraft type, and be associated with schematics, design documents, circuit diagrams, or the like that indicate sensors and/or parameters of aircraft 200 associated with each respective operationally distinct portion. Further, testing data or simulation data may be available that indicates forces experienced by each respective operationally distinct portion and functions performed by each portion. Selecting a group of sensors and/or parameters that correspond to a given portion of aircraft 200 can include determining forces experienced by and/or functions performed by the given portion, and determining sensors and/or parameters that relate to the forces and/or functionalities.

As one example described with respect to further figures, aft fuselage 210 may be an operationally distinct portion of aircraft 200 for which a grouping of sensors and/or parameters is selected. Aft fuselage 210 may be determined to experience torsional and bending moments throughout a flight of aircraft 200 in response to changes in aileron position and elevator position respectively. For example, such forces might be measured during simulations and/or design testing of aircraft 200. Roll, pitch, and yaw data of aircraft 200, in conjunction with aileron and elevator positions, and possibly other forces and/or parameters, may indicate how aft fuselage 210 responds to the forces experienced during flight. Accordingly, an accelerometer and gyroscopic sensor (e.g., an inertial measurement unit (IMU)), left and right aileron positions, elevator positions, and related control signals from an aircraft controller might be selected as a grouping of sensors and parameters that correspond to the aft fuselage 210 portion of aircraft 200. More or fewer sensors and/or parameters might be selected.

Groupings of sensors and/or parameters may be selected for some or all of the other depicted portions of aircraft 200.

Further description of embodiments for selecting groups of sensors and/or parameters are described below.

FIG. 3 depicts an example of feature data 300 associated with a portion of an aircraft, according to an example implementation. The depicted example includes a subset of feature data associated with aft fuselage 210 depicted in FIG. 2. In particular, the depicted feature data shows left aileron positions and right aileron positions during a first flight "001" of aircraft 200 and a second flight "002" of aircraft 200, which corresponds to "aircraft number #10001." As noted above, such data may be logged by aircraft 200 during flight, and transmitted to a computing device, such as computing device 102 after completion of the flight. As shown in FIG. 3, the feature data may include data from yet further flights of aircraft 200, or from other aircraft of the same aircraft type.

Because the data associated with aft fuselage 210 is timestamped, it can be evaluated relative to other data determined during each flight. For example, the time stamps for changing aileron position can be compared to corresponding control signals of aircraft 200 and roll data from an IMU of aircraft 200 to determine how aft fuselage 210 is responding to forces experienced during flight of aircraft 200.

FIG. 4 depicts an example of predetermined operational metrics 400 and additional operational metrics 402 associated with a portion of an aircraft, according to an example implementation. Predetermined operational metrics 400 may be determined based on the type of data associated with corresponding sensors and/or parameters of a particular grouping, and may be selected such that values for the predetermined operational metrics are indicative of responses of the aircraft to forces experienced by each respective portion of the aircraft. In the depicted example, predetermined operational metrics 400 include a minimum difference between the left and right aileron of an aircraft during a particular flight, a maximum difference between the left and right aileron of an aircraft during a particular flight, and an average difference between the left and right aileron of an aircraft during a particular flight. Accordingly, the predetermined operational metrics can include a subset of feature data 300, and one or more additional values determined from feature data 300.

In other examples, feature data for a particular sensor and/or parameter might be used in its entirety. For instance, where a parameter is used that includes a binary indication for a particular flight, such as whether a failsafe mode was entered into during flight, the predetermined operational metric might match the corresponding feature data.

In examples, determining predetermined operational metrics 400 may be performed automatically upon selection of a grouping of sensors and/or parameters. For example, each sensor and parameter might correspond to a set of operational metrics. In other examples, predetermined operational metrics 400 may be selected by way of a user interface. These examples are explained in further detail below.

The depicted predetermined operational metrics 400 show values determined for a plurality of flights of a first aircraft (aircraft 200) that corresponds to "aircraft #10001," a second aircraft that corresponds to "aircraft #10002," and possibly other aircraft. Additional operational metrics 402 are determined based on a comparison of predetermined operational metrics 400 over this plurality of flights. For instance, in the depicted example, additional operational metrics 402 for "aircraft #10001" are determined based on a comparison of a first flight "001" and a second flight "002." Additional operational metrics 402 include overall minimums, maximums, and averages from this plurality of flights. Accordingly, additional operational metrics 402 are indicative of responses of the aircraft to forces experienced by each respective portion of the aircraft that corresponds to a selected grouping of sensors and/or parameters during multiple flights of the aircraft. Further, since additional operational metrics 402 include overall maximum, minimum, and average values of predetermined operational metrics 400, using additional operational metrics 402 as inputs to a machine learning model may reduce the amount of computing power required for training.

Figure 5:
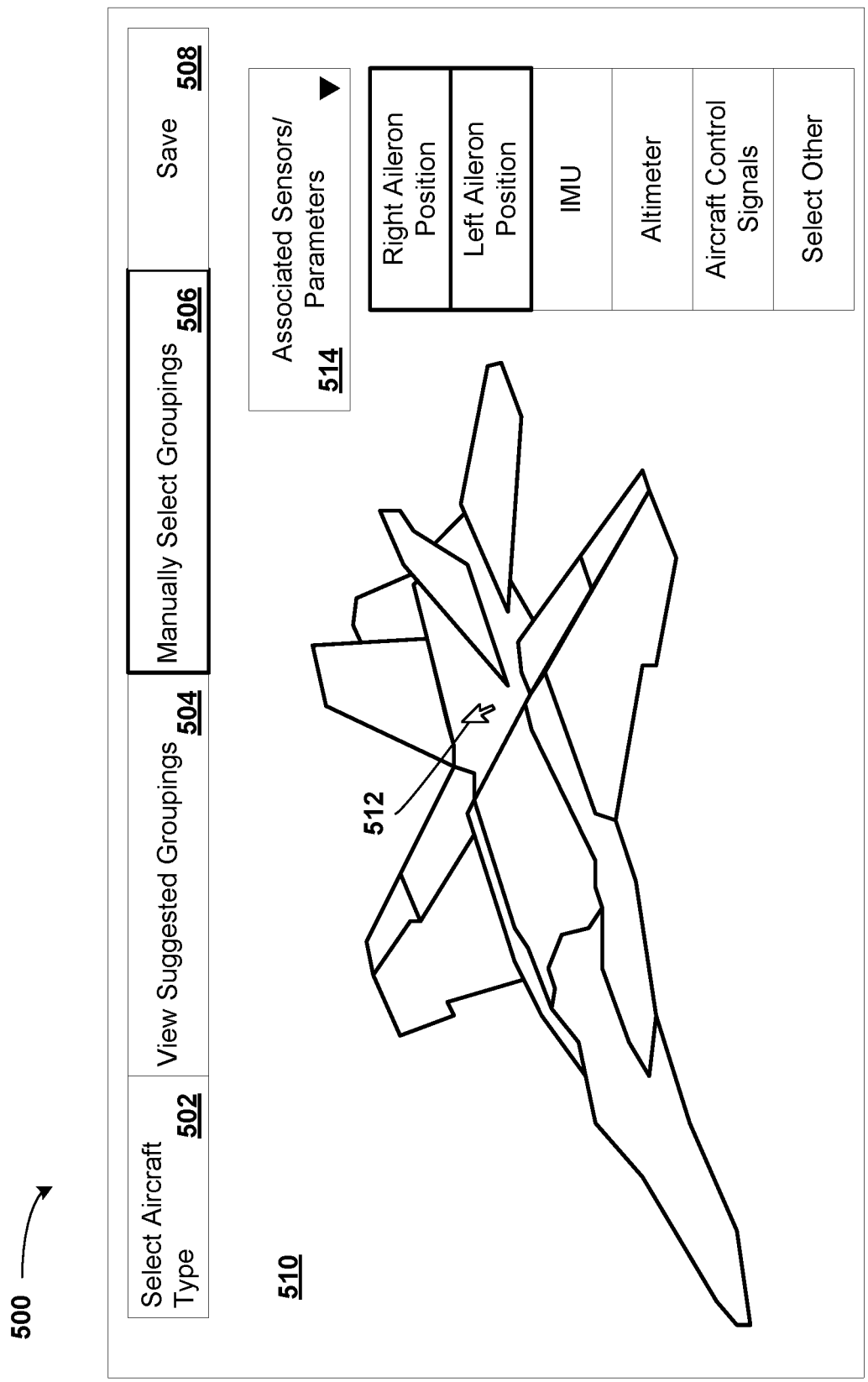
FIG. 5 is an example illustration of a user interface for selecting groupings of sensors and/or parameters associated with a portion of an aircraft, according to an example implementation.

FIG. 5 is an example illustration of a user interface 500 for selecting groupings of sensors and/or parameters associated with a portion of an aircraft, according to an example implementation. The user interface can include an option to select an aircraft type 502, an option to view suggested groupings of sensors and/or parameters 504, an option to manually select groupings of sensors and/or parameters 506, and an option to save a selected grouping 508.

In examples where the option to view suggested groupings of sensors and/or parameters 504 is selected, a computing device 102 may receive an indication of the selection by way of user interface 500. Computing device 102 may receive, from database 116, simulation and/or test data, known sensors and/or parameters of the aircraft type that relate to expected in-flight forces to be experienced by an aircraft of the aircraft type. For example, the known sensors and/or parameters may be derived from design documents, design testing data, or other information pertaining to the type of aircraft. Based on receiving the simulation and/or test data, computing device 102 may determine known sensors and/or parameters of the aircraft type that relate to the expected in-flight forces. For instance, where the simulation and/or test data indicates that a given portion of the aircraft type is expected to experience pitch, roll, or yaw moments, computing device 102 may determine that a known IMU of the aircraft type relates to expected in-flight forces of the particular portion. Computing device 102 may also select the groupings of sensors and/or parameters that correspond to the plurality of portions of the aircraft type based on determining the known sensors and/or parameters of the aircraft type that relate to the expected in-flight forces.

Computing device 102 may further provide, by way of the user interface 500 the selected groupings as suggested groupings, and provide an option to edit or accept the suggested groupings. Upon receiving an indication to edit or accept the suggested groupings by way of user interface 500, computing device 102 may save the groupings in memory 108. FIG. 5 does not depict this scenario. Instead, FIG. 5 depicts a scenario where user has selected the option to manually select groupings of sensors and/or parameters 506. In some examples, computing device may simply select the groupings of sensors and/or parameters automatically, and without user contribution.

Consistent with an example implementation described herein, user interface 500 includes a schematic view 510 of an aircraft type, and depicts a cursor 512 being used to select a aft fuselage portion of the aircraft type. The selected aft fuselage portion might correspond to aft fuselage 210 described above with respect to FIG. 2. After receiving the selection of the aft fuselage portion by way of user interface 500, a computing device 102 may retrieve a list of selectable sensors and parameters 514 associated with the aircraft type and provide the list for selection by the user by way of user interface 500. As depicted in the present example, computing device 102 may order the provided list by relevance to the selected aft fuselage portion of the aircraft type. The order of relevance may be determined based on simulation and/or test data, or known sensors and/or parameters of the aircraft type that relate to expected in-flight forces to be experienced by an aircraft of the aircraft type. For example, the known sensors and/or parameters may be derived from design documents, design testing data, or other information pertaining to the aircraft type.

After manually selecting a grouping of sensors and/or parameters, a user can select the option to save the groupings 508. In response to receiving an indication of the selections by way of user interface 500, computing device 102 may store the groupings in memory 108 and/or in database 116. Further, for each selected grouping, user interface 500 may include selectable options for predetermined operational metrics 400 associated with each selected sensor and/or parameter. The operational metrics may include types of feature data 300 that can be received from an aircraft 200 of the aircraft type, or types of data that can be derived from the feature data 300. Additionally or alternatively, the operational metrics may include parameters associated with sensors or components of aircraft 200. Predetermined operational metrics 400 may automatically be selected based on the selected sensors and parameters rather than being selected by way of user interface 500.

After predetermined operational metrics 400 are selected, additional operational metrics 402 may be selected. For instance, the additional operational metrics 402 may be selectable by way of user interface 500. In other examples, the additional operational metrics 402 may be automatically selected based on the selected predetermined operational metrics. In examples, the additional operational metrics may include overall maximums, minimums, and averages of the predetermined operational metrics 400 as determined over multiple flights of an aircraft 200.

Figure 6:
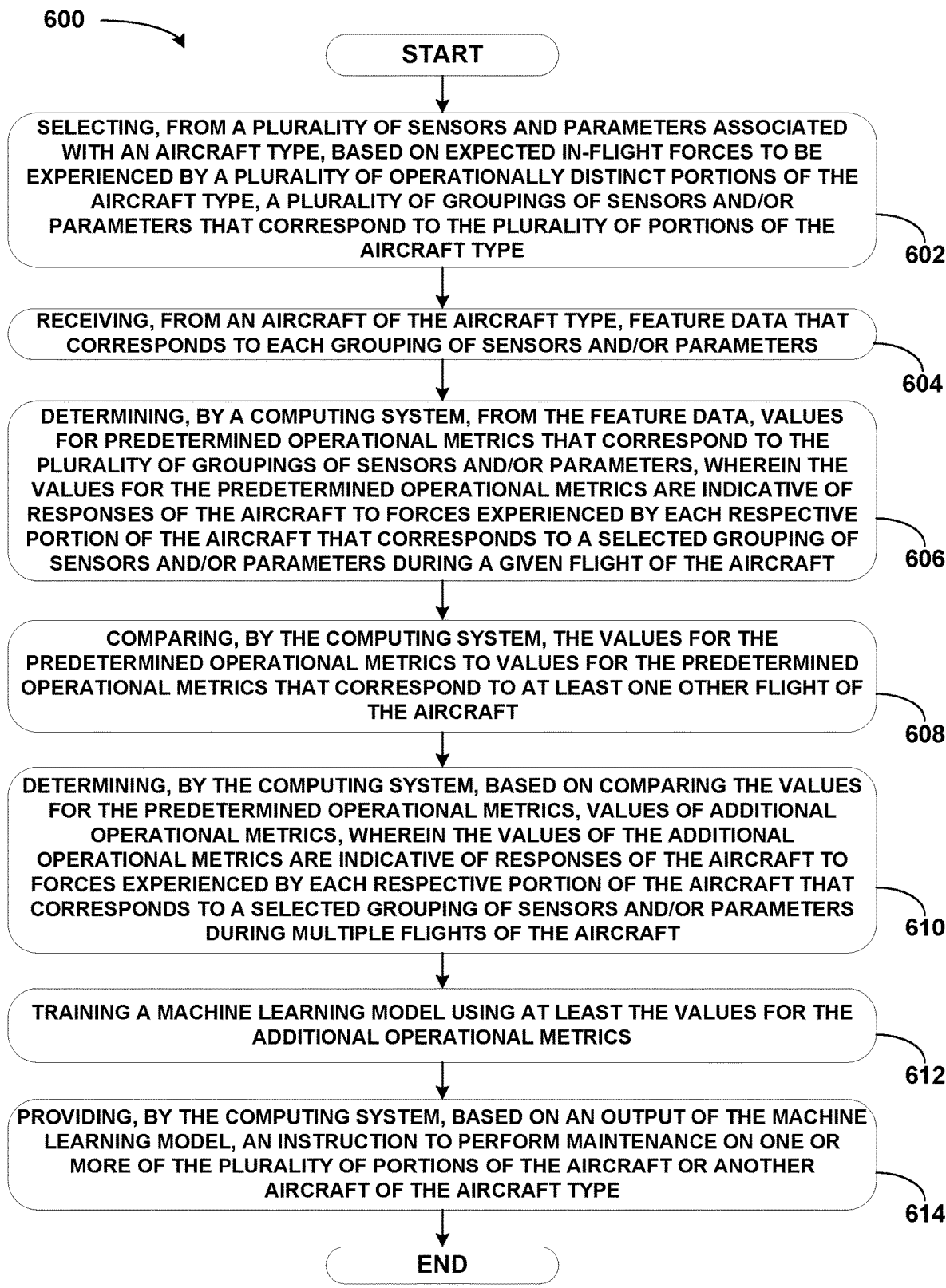
FIG. 6 shows a flowchart of an example method for determining whether to perform aircraft maintenance, according to an example implementation.

FIG. 6 shows a flowchart of an example of a method 600 for determining whether to perform aircraft maintenance, according to an example implementation. Method 600 shown in FIG. 6 presents an example of a method that could be used with the computing device 102 shown in FIG. 1, with components of computing device 102, or in conjunction with an aircraft, such as aircraft 200 shown in FIG. 2, for example. Further, devices or systems may be used or configured to perform logical functions presented in FIG. 6. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 600 may include one or more operations, functions, or actions as illustrated by one or more of blocks 602-614. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 6, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 602, method 600 includes selecting, from a plurality of sensors and parameters associated with an aircraft type, based on expected in-flight forces to be experienced by a plurality of operationally distinct portions of the aircraft type, a plurality of groupings of sensors and/or parameters that correspond to the plurality of portions of the aircraft type. As described above, selecting the groupings of sensors and/or parameters may be performed automatically by a computing device 102, or may be selected by way of a user interface 500. Grouping the sensors and/or parameters may allow for more flexible and targeted training of machine learning models, and may further serve to limit the amount of data transmitted between aircraft 200 and computing device 102, and that is required to train the machine learning model.

Figure 7:
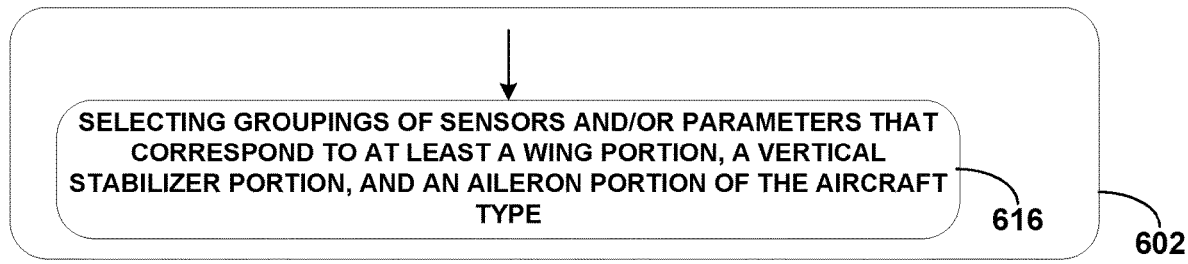
FIG. 7 shows a flowchart of another example method for use with the method shown in FIG. 6, according to an example implementation.

FIG. 7 shows a flowchart of an example method for determining whether to perform aircraft maintenance as shown in block 602, according to an example implementation. At block 616, functions include selecting groupings of sensors and/or parameters that correspond to at least wings 206, vertical stabilizers 212, and ailerons/flaps 208 of the aircraft type. Accordingly, in examples, the groupings of sensors and/or parameters might not account for each operationally distinct portion of the aircraft type. This may allow for more targeted aircraft maintenance determinations, or may allow human inspectors to focus on certain portions of the aircraft 200, while allowing for automated determinations with respect to other portions of the aircraft 200.

Figure 8:
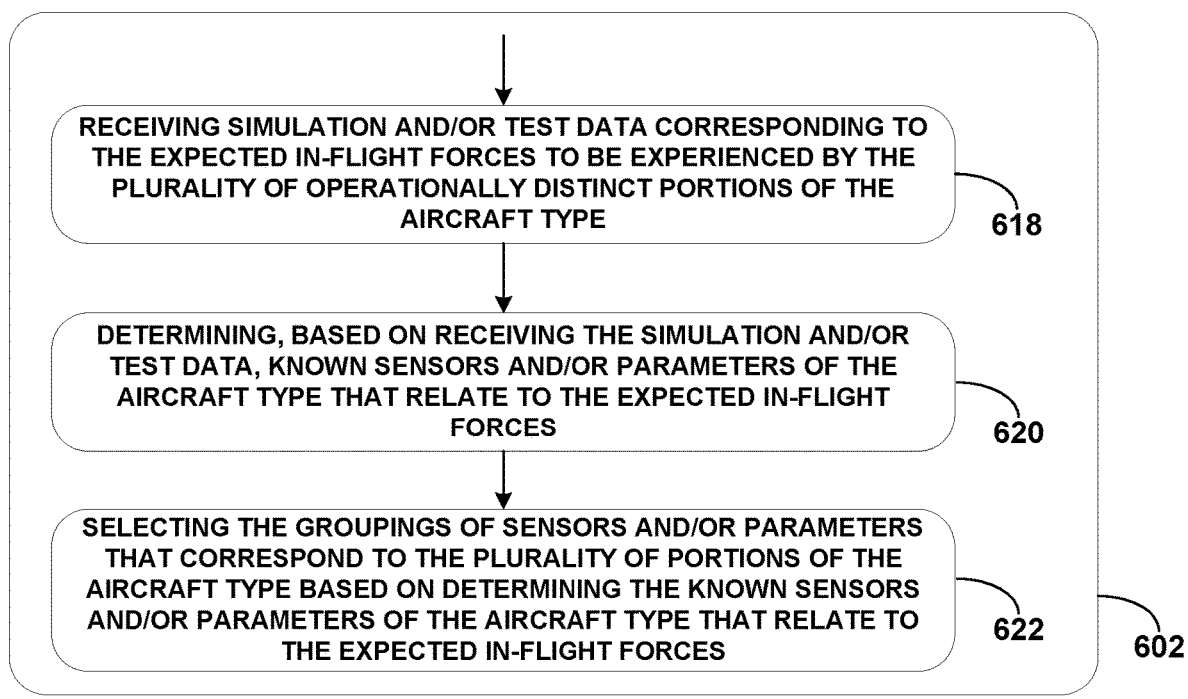
FIG. 8 shows a flowchart of another example method for use with the method shown in FIG. 6, according to an example implementation.

FIG. 8 shows a flowchart of an example method for determining whether to perform aircraft maintenance as shown in block 602, according to an example implementation. At block 618, functions include receiving simulation and/or test data corresponding to the expected in-flight forces to be experienced by the plurality of operationally distinct portions of the aircraft type. For example, as described above, computing device 102 may receive the simulation and/or test data from database 116. At block 620, functions include determining, based on receiving the simulation and/or test data, known sensors and/or parameters of the aircraft type that relate to the expected in-flight forces.

For example, the simulation and/or test data may indicate types of forces and force levels typically experienced by the operationally distinct portions of the aircraft type. At block 622, functions include selecting the groupings of sensors and/or parameters that correspond to the plurality of portions of the aircraft type based on determining the known sensors and/or parameters of the aircraft type that relate to the expected in-flight forces. For example, having received the simulation and/or test data indicating types of forces and force levels typically experienced by the operationally distinct portions of the aircraft type, computing device 102 may associate sensors and/or parameters with the indicated types of forces and force levels. Accordingly, in examples, computing device 102 may automatically select the groupings of sensors and/or parameters. Performing such selections automatically may allow for more efficient and consistent maintenance determinations across multiple aircraft types.

Figure 9:
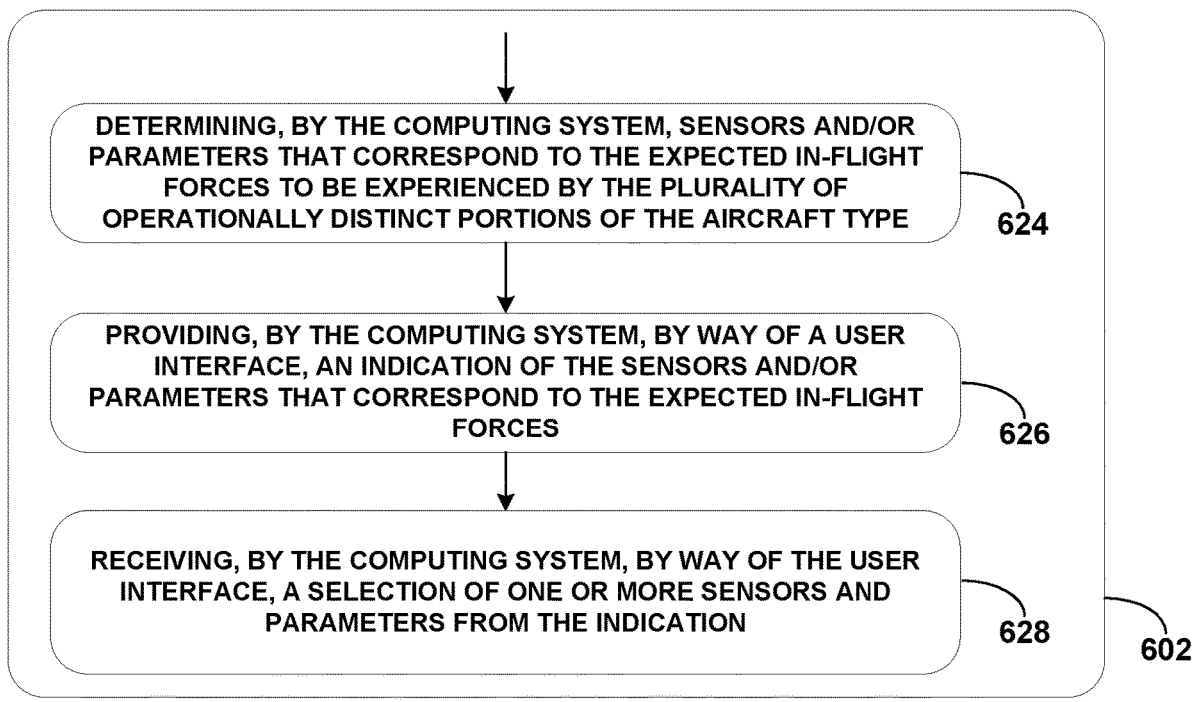
FIG. 9 shows a flowchart of another example method for use with the method shown in FIG. 6, according to an example implementation.

FIG. 9 shows a flowchart of an example method for determining whether to perform aircraft maintenance as shown in block 602, according to an example implementation. At block 624, functions include determining, by the computing system 100, sensors and/or parameters that correspond to the expected in-flight forces to be experienced by the plurality of operationally distinct portions of the aircraft type. At block 626, functions include providing, by the computing system 100, by way of a user interface 500, an indication of the sensors and/or parameters that correspond to the expected in-flight forces. At block 628, functions include receiving, by the computing system 100, by way of the user interface 500, a selection of one or more sensors and parameters from the indication. FIG. 9 thus depicts operations that correspond to the interface depicted in FIG. 5. Thus, in examples, a user may provide tailored selections of groupings of sensors and/or parameters. This may allow for more targeted maintenance determinations based on maintenance goals or standards that computing system 100 might not be aware of.

Figure 10:
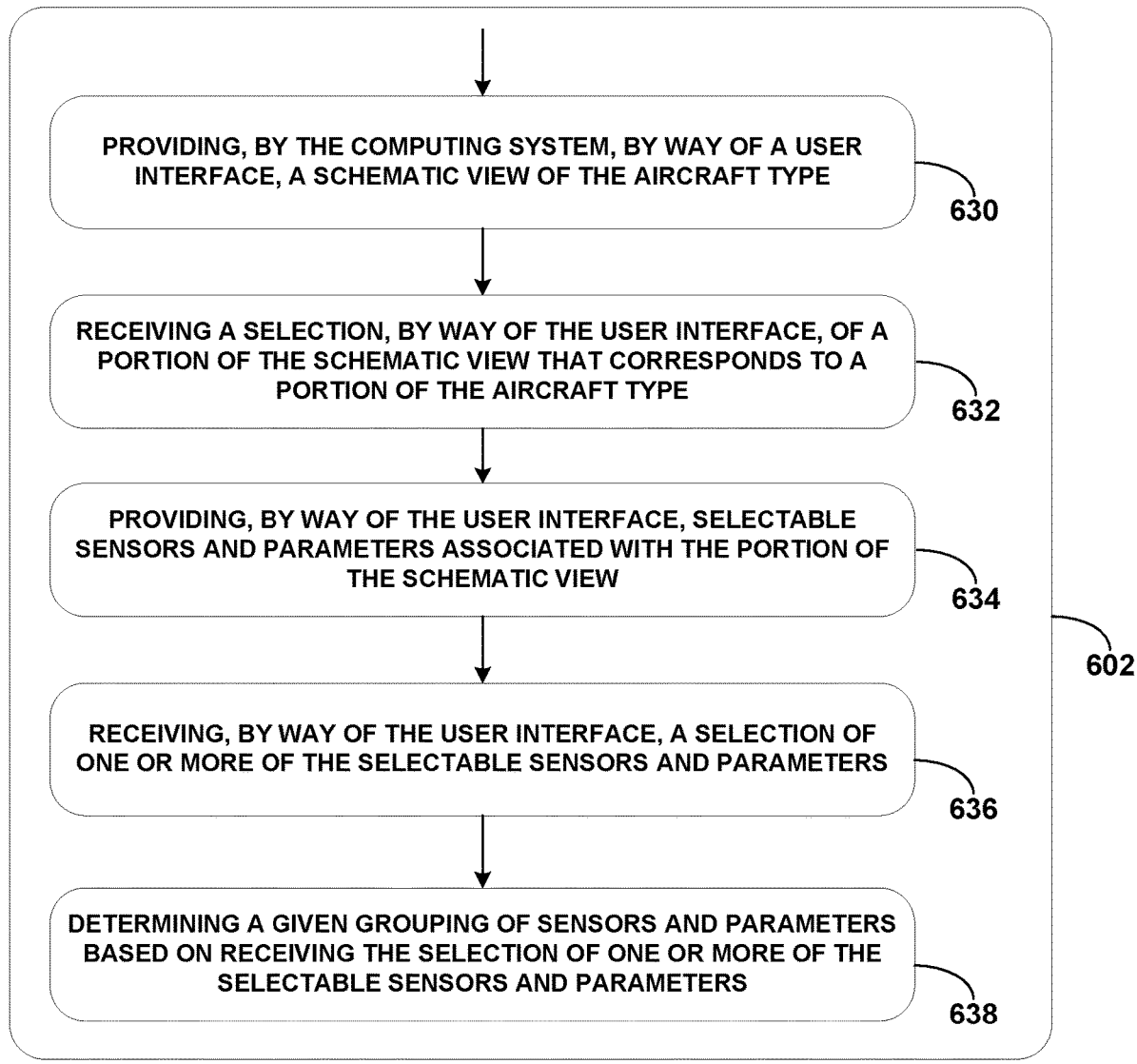
FIG. 10 shows a flowchart of another example method for use with the method shown in FIG. 6, according to an example implementation.

FIG. 10 shows a flowchart of an example method for determining whether to perform aircraft maintenance as shown in block 602, according to an example implementation. At block 630, functions include providing, by the computing system 100, by way of a user interface 500, a schematic view 510 of the aircraft type. In examples, a schematic view may be a three-dimensional (3D) rendering of the aircraft type, such as a transparent rendering, having selectable portions. At block 632, functions include receiving a selection, by way of the user interface 500, of a portion of the schematic view 510 that corresponds to a portion of the aircraft type. For example, as depicted in FIG. 5, an aft fuselage portion of schematic view 510 is depicted as being selected. At block 634, functions include providing, by way of the user interface, selectable sensors and parameters 514 associated with the portion of the schematic view 510. At block 636, functions include receiving, by way of the user interface 500, a selection of one or more of the selectable sensors and parameters 514. The selectable sensors and parameters 514 may be suggested sensors and/or parameters, or may be a comprehensive set of sensors and parameters associated with the aircraft type. At block 638, functions include, determining a given grouping of sensors and parameters based on receiving the selection of one or more of the selectable sensors and parameters. Thus, in examples, a user may provide tailored selections of groupings of sensors and/or parameters in accordance with suggested sensors and/or parameters, or based on manual determinations.

Returning to FIG. 6, at block 604, functions include receiving, from an aircraft 200 of the aircraft type, feature data 300 that corresponds to each grouping of sensors and/or parameters. For example, feature data 300 might be logged by aircraft 200 and transmitted to computing device 102 upon completion of a flight.

At block 606, functions include determining, by a computing system 100, from the feature data 300, values for predetermined operational metrics 400 that correspond to the plurality of groupings of sensors and/or parameters, wherein the values for the predetermined operational metrics 400 are indicative of responses of the aircraft 200 to forces experienced by each respective portion of the aircraft 200 that corresponds to a selected grouping of sensors and/or parameters during a given flight of the aircraft 200. As described above, the predetermined operational metrics 400 may be selectable by way of a user interface 500, or may be automatically determined by computing device 102.

At block 608, functions include comparing, by the computing system 100, the values for the predetermined operational metrics 400 to values for the predetermined operational metrics 400 that correspond to at least one other flight of the aircraft 200.

At block 610, functions include determining, by the computing system 100, based on comparing the values for the predetermined operational metrics 400, values of additional operational metrics 402, wherein the values of the additional operational metrics 402 are indicative of responses of the aircraft to forces experienced by each respective portion of the aircraft 200 that corresponds to a selected grouping of sensors and/or parameters during multiple flights of the aircraft 200.

Figure 11:
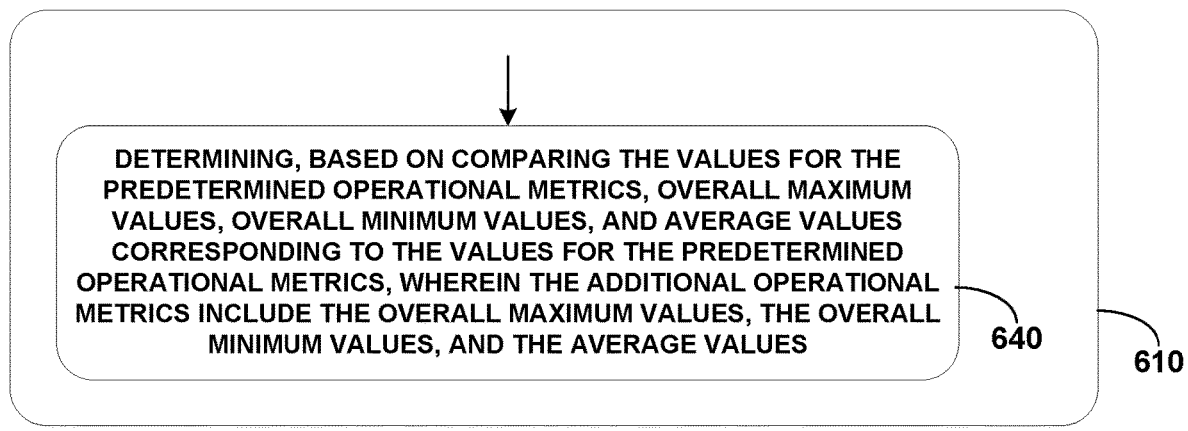
FIG. 11 shows a flowchart of another example method for use with the method shown in FIG. 6, according to an example implementation.

FIG. 11 shows a flowchart of an example method for performing the determining as shown in block 610 according to an example implementation. At block 640, functions include determining, based on comparing the values for the predetermined operational metrics 400, overall maximum values, overall minimum values, and average values corresponding to the values for the predetermined operational metrics 400, wherein the additional operational metrics 402 include the overall maximum values, the overall minimum values, and the average values.

Figure 12:
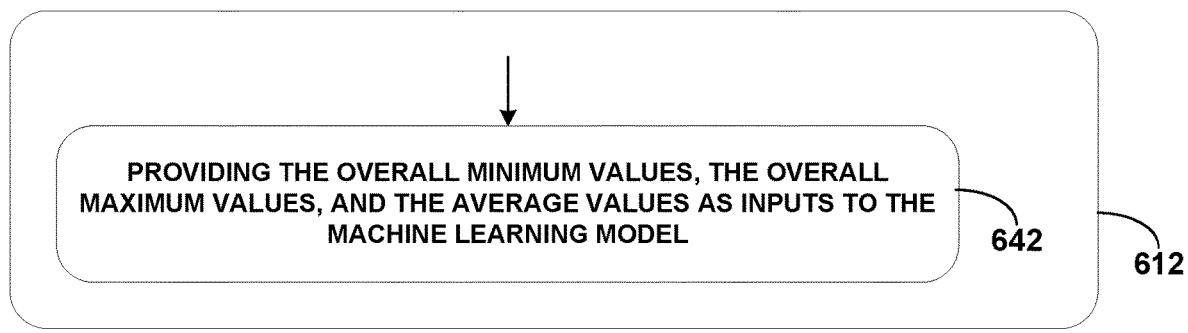
FIG. 12 shows a flowchart of another example method for use with the method shown in FIG. 11, according to an example implementation.

FIG. 12 shows a flowchart of an example method for performing the training as shown in block 612 according to an example implementation associated with block 640. At block 642, functions include providing the overall minimum values, the overall maximum values, and the overall average values determined at block 640 as inputs to the machine learning model.

Returning to FIG. 6, at block 612, functions include training a machine learning model using at least the values for the additional operational metrics 402. As described above, the machine learning model may include one or more machine learning models, and may be associated with a machine learning model server 118.

At block 614, functions include providing, by the computing system 100, based on an output of the machine learning model, an instruction to perform maintenance on one or more of the plurality of portions of the aircraft 200 or another aircraft of the aircraft type. In examples, the trained machine learning model can be executed to evaluate performance of operationally distinct portions of aircraft during testing/implementation. Computing device 102 may provide test data from a given aircraft, which may include data logged by the aircraft during flight. The given aircraft might be aircraft 200, in which case the test data might correspond to a test flight of aircraft 200, or another aircraft of the aircraft type, such as another aircraft in a fleet of aircraft. Computing device 102 may provide data similar to that used to train the machine learning model. For example, the test data might include values for predetermined operational metrics 400 or additional operational metrics 402. This data, or other test data, can be provided as an input to the machine learning model after it has been trained. The machine learning model may be executed to provide an output based on receiving the test data. For example, computing device 102 may cause the machine learning model to execute based on the test data of the aircraft or another aircraft of the aircraft type. Responsive to causing the machine learning model to execute, the computing device 102, based on an output of the machine learning model, may provide the instruction to perform maintenance on one or more of the plurality of portions of the aircraft or another aircraft of the aircraft type. For instance, providing the instruction to perform maintenance on one or more of the plurality of portions of aircraft 200 may comprise transmitting the instruction to aircraft maintenance controller 120, which may schedule maintenance of aircraft 200 and/or cause a maintenance facility to perform maintenance on aircraft 200.

Figure 13:
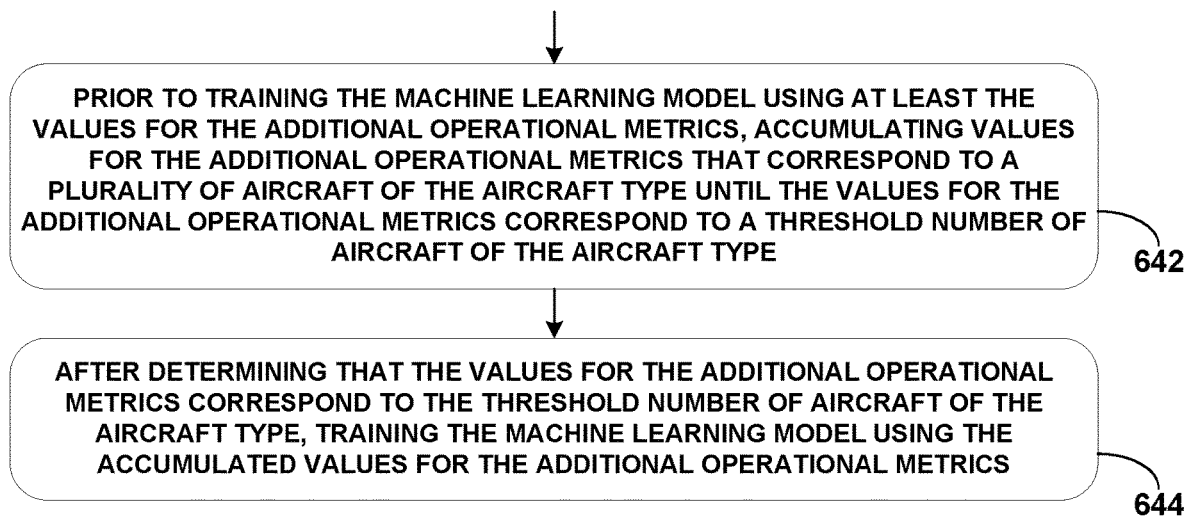
FIG. 13 shows a flowchart of another example method for use with the method shown in FIG. 6, according to an example implementation.

FIG. 13 shows a flowchart of an example method for use with the method 600, according to an example implementation. At block 642, functions include, prior to training the machine learning model using at least the values for the additional operational metrics 402, accumulating values for the additional operational metrics 402 that correspond to a plurality of aircraft of the aircraft type until the values for the additional operational metrics 402 correspond to a threshold number of aircraft of the aircraft type. The threshold number of aircraft may be, for example, 10 aircraft. In other examples, the threshold number of aircraft may be a percentage of a total number of aircraft of the aircraft type. For example, the threshold number may be about 25% of the total number of aircraft of the aircraft type. At block 644, functions include, after determining that the values for the additional operational metrics 402 correspond to the threshold number of aircraft of the aircraft type, training the machine learning model using the accumulated values for the additional operational metrics. Waiting to train the training model until more data is available in this fashion may allow for more confidence in the output of the training model once it is trained.

Figure 14:
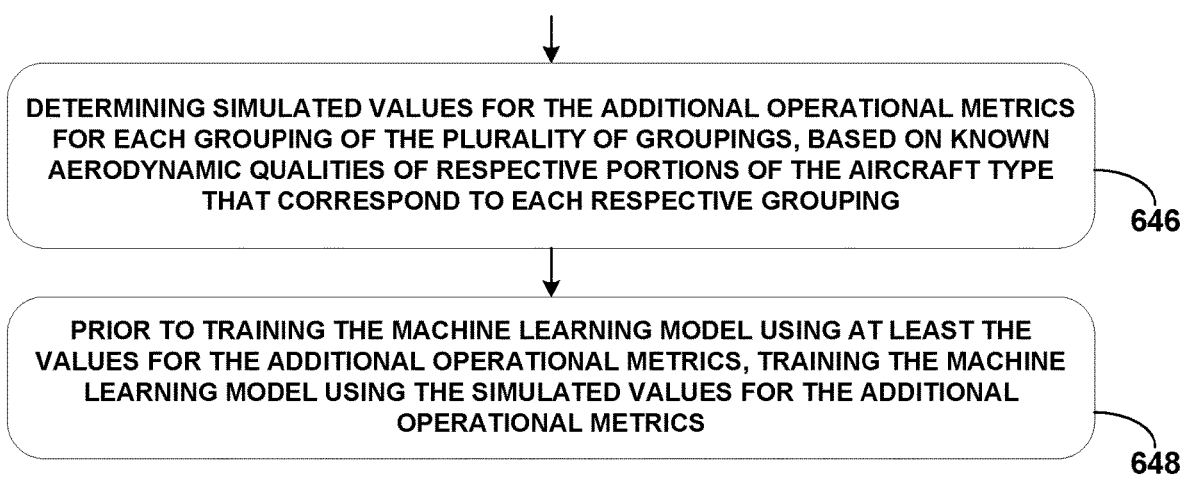
FIG. 14 shows a flowchart of another example method for use with the method shown in FIG. 6, according to an example implementation.

FIG. 14 shows a flowchart of an example method for use with the method 600, according to an example implementation. At block 646, functions include determining simulated values for the additional operational metrics 402 for each grouping of the plurality of groupings, based on known aerodynamic qualities of respective portions of the aircraft type that correspond to each respective grouping. This may include simulated flights that generate simulated forces similar to those expected during an actual flight of aircraft 200. At block 648, functions include, prior to training the machine learning model using at least the values for the additional operational metrics 402, training the machine learning model using the simulated values for the additional operational metrics 402. In this fashion, the machine learning model may be exposed to significant amounts of data prior to being trained by actual data from flights of aircraft 200.

Figure 15:
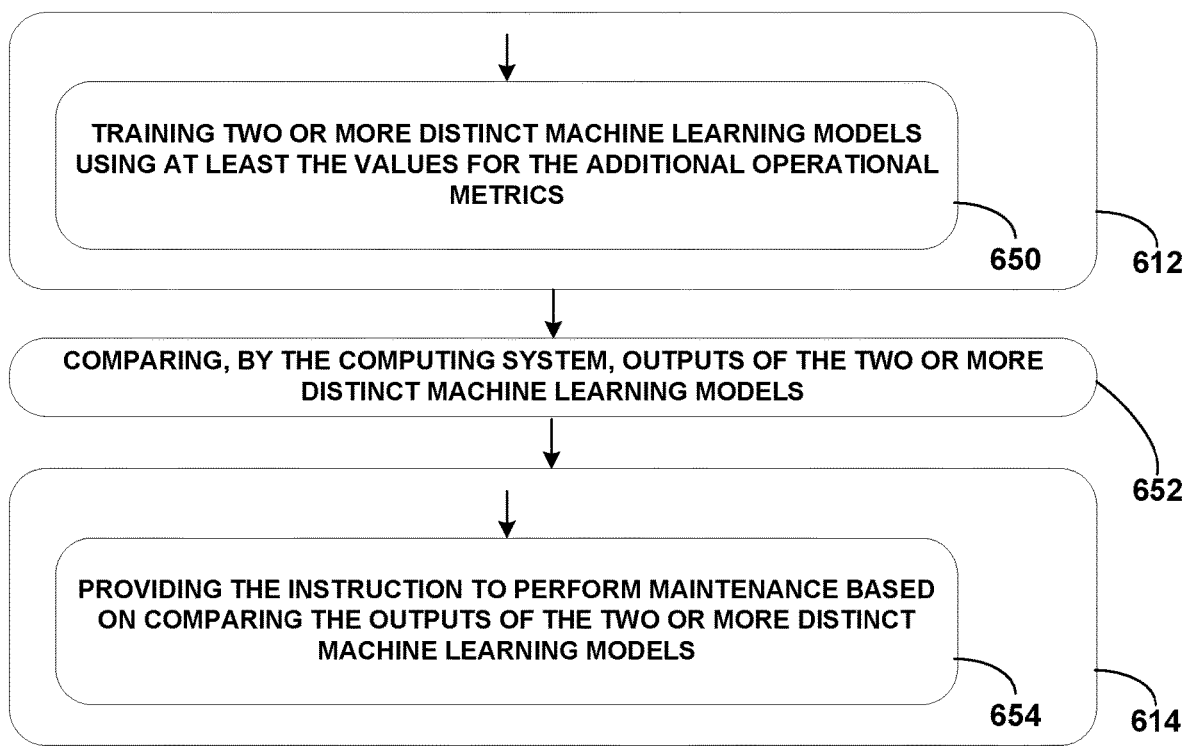
FIG. 15 shows a flowchart of another example method for use with the method shown in FIG. 6, according to an example implementation.

FIG. 15 shows a flowchart of an example method for use with the method 600, according to an example implementation. Block 650 is a further example for performing the training as shown in block 612 according to an example implementation. At block 650, functions include training two or more distinct machine learning models using at least the values for the additional operational metrics 402. As noted above, the machine learning models can include a random forest model, support vector machine (SVM), a neural network, or any other type of algorithm that uses machine learning. Training multiple distinct machine learning models may allow for outputs for a given model to be vetted by the others once it is executed.

At block 652, functions include comparing, by the computing system 100, outputs of the two or more distinct machine learning models. For example, outputs of two executed machine learning models might be compared to determine whether they are substantially similar. For instance, where the outputs provide binary outputs regarding whether a given portion of an aircraft requires maintenance, the outputs can be compared to determine if they are the same. In examples where the executed machine learning models provide performance ratings of each given portion of an aircraft, the ratings might be compared to determine that they share a threshold extent of similarity. For instance the performance ratings of a given portion might be compared to determine whether they are within 10% of each other. If the two or more performance ratings each fall within the threshold, they may be determined as substantially similar, and therefore in agreement with respect to whether performance should be performed on the given portion of the aircraft.

Block 654 is a further example for performing the providing as shown in block 614 according to an example implementation. At block 654, functions include providing the instruction to perform maintenance based on comparing the outputs of the two or more distinct machine learning models. For instance, if the outputs of the training models are the same or fall within the threshold level of similarity, and indicate that maintenance should be performed on a given portion of an aircraft, an instruction may be provided to perform maintenance on that portion. Similarly, if the outputs of the training models are the same or fall within the threshold level of similarity, and indicate that maintenance should not be performed on a given portion of an aircraft, an instruction may be provided not to perform maintenance on that portion. However, if the outputs of the training models are not the same or do not fall within the threshold level of similarity, and indicate that maintenance should be performed on a given portion of an aircraft, an instruction may be provided to perform a manual evaluation of that portion. Similarly, if the outputs of the training models are not the same or do not fall within the threshold level of similarity, and conflict as to whether maintenance should be performed on a given portion of an aircraft, an instruction may be provided to perform a manual evaluation of that portion. By vetting the outputs of the executed machine learning models against each other in this fashion, the system 100 can be more confident in the provided instructions.

Figure 16:
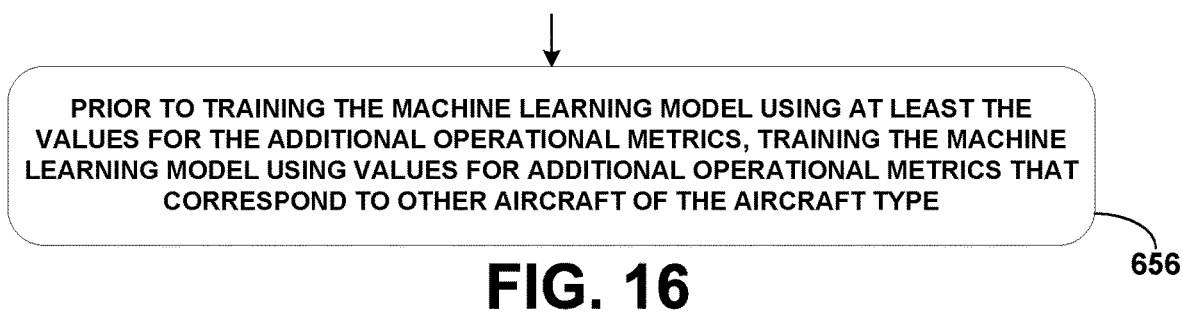
FIG. 16 shows a flowchart of another example method for use with the method shown in FIG. 6, according to an example implementation.

FIG. 16 shows a flowchart of an example method for use with the method 600, according to an example implementation. At block 656, functions include, prior to training the machine learning model using at least the values for the additional operational metrics 402, training the machine learning model using values for additional operational metrics 402 that correspond to other aircraft of the aircraft type. This may similarly allow for confidence in an output of the machine learning model.

Figure 17:
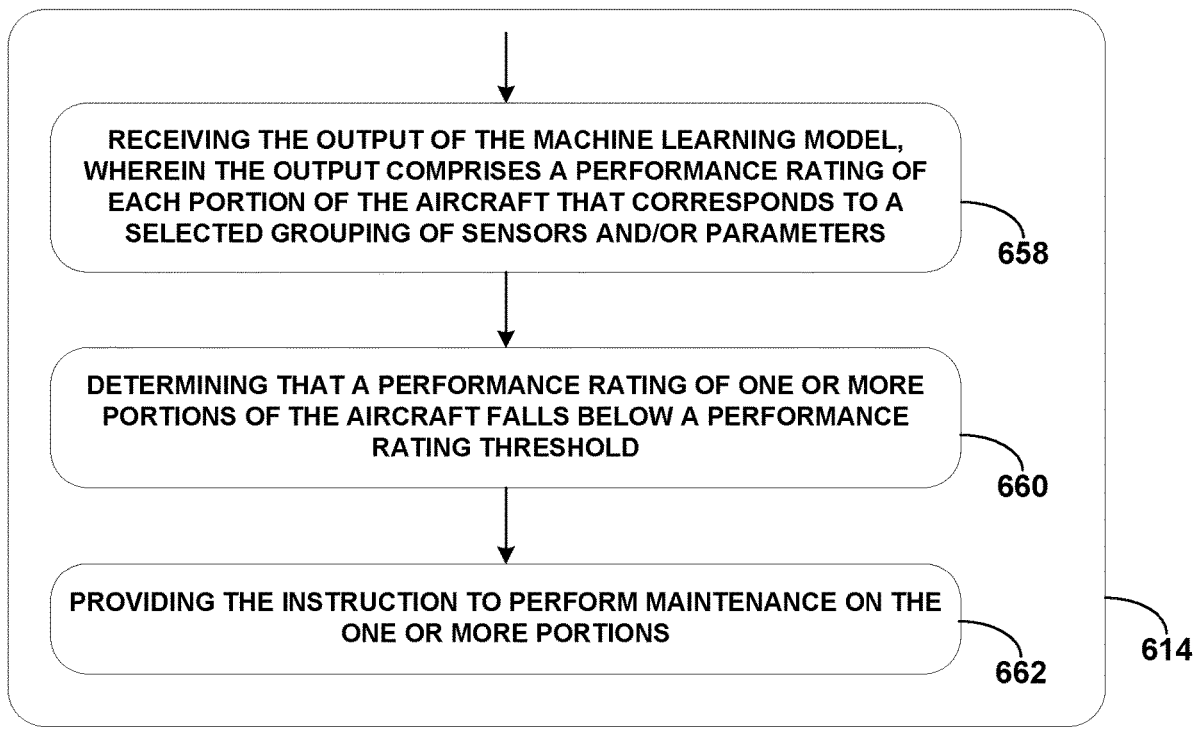
FIG. 17 shows a flowchart of another example method for use with the method shown in FIG. 6, according to an example implementation.

FIG. 17 shows a flowchart of an example method for performing the providing as shown in block 614 according to an example implementation. At block 658, functions include receiving the output of the machine learning model, wherein the output comprises a performance rating of each portion of the aircraft that corresponds to a selected grouping of sensors and/or parameters. At block 660, functions include determining that a performance rating of one or more portions of the aircraft 200 falls below a performance rating threshold. The threshold may indicate a percentage that shows how closely the additional operational metrics 402 match expected values for those metrics. The expected values might be based on simulated flight data, on data received from one or more maintained aircraft, or on outputs generated by the machine learning model. The threshold might be, for example, an 80% performance rating threshold. At block 662, functions include providing the instruction to perform maintenance on the one or more portions. By basing the instruction to maintain aircraft 200 on a threshold, tolerance levels can be established that vary based on aircraft type, or based on particular operationally distinct portions of aircraft 200. This may allow for flexible maintenance decisions that rely on maintenance standards that differ based on which portion of aircraft 200 is being evaluated.

Within the examples described herein, methods and systems provide for consistent and reliable maintenance determinations corresponding to an aircraft of plurality of aircraft. The disclosed systems provide for automatic or user-based determinations for training a machine learning model using data that corresponds to targeted metrics associated with a particular aircraft type. In addition, vetting the machine learning model by using more than one type of learning model, and by requiring threshold amounts of training before using the model allow for more reliable outputs and maintenance determinations.

By the term "substantially," "similarity," and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method for determining whether to perform aircraft maintenance, comprising:
   selecting, from a plurality of sensors and parameters associated with an aircraft type, based on expected in-flight forces to be experienced by a plurality of operationally distinct portions of the aircraft type, a plurality of groupings of sensors and/or parameters that correspond to the plurality of portions of the aircraft type;
   receiving, from an aircraft of the aircraft type, feature data that corresponds to each grouping of sensors and/or parameters;
   determining, by a computing system, from the feature data, values for predetermined operational metrics that correspond to the plurality of groupings of sensors and/or parameters, wherein the values for the predetermined operational metrics are indicative of responses of the aircraft to forces experienced by each respective portion of the aircraft that corresponds to a selected grouping of sensors and/or parameters during a given flight of the aircraft;
   comparing, by the computing system, the values for the predetermined operational metrics to values for the predetermined operational metrics that correspond to at least one other flight of the aircraft;
   determining, by the computing system, based on comparing the values for the predetermined operational metrics, values of additional operational metrics, wherein the values of the additional operational metrics are indicative of responses of the aircraft to forces experienced by each respective portion of the aircraft that corresponds to a selected grouping of sensors and/or parameters during multiple flights of the aircraft;
   training a machine learning model using at least the values for the additional operational metrics; and
   providing, by the computing system, based on an output of the machine learning model, an instruction to perform maintenance on one or more of the plurality of portions of the aircraft or another aircraft of the aircraft type.

2. The method of claim 1, wherein selecting the groupings of sensors and/or parameters that correspond to the plurality of portions of the aircraft type comprises selecting groupings of sensors and/or parameters that correspond to at least a wing portion, a vertical stabilizer portion, and an aileron portion of the aircraft type.

3. The method of claim 1, wherein selecting the groupings of sensors and/or parameters that correspond to the plurality of portions of the aircraft type comprises:
   receiving simulation and/or test data corresponding to the expected in-flight forces to be experienced by the plurality of operationally distinct portions of the aircraft type;
   determining, based on receiving the simulation and/or test data, known sensors and/or parameters of the aircraft type that relate to the expected in-flight forces; and
   selecting the groupings of sensors and/or parameters that correspond to the plurality of portions of the aircraft type based on determining the known sensors and/or parameters of the aircraft type that relate to the expected in-flight forces.

4. The method of claim 1, wherein selecting the groupings of sensors and/or parameters that correspond to the plurality of portions of the aircraft type comprises:
   determining, by the computing system, sensors and/or parameters that correspond to the expected in-flight forces to be experienced by the plurality of operationally distinct portions of the aircraft type;

providing, by the computing system, by way of a user interface, an indication of the sensors and/or parameters that correspond to the expected in-flight forces; and receiving, by the computing system, by way of the user interface, a selection of one or more sensors and parameters from the indication.

5. The method of claim 1, wherein selecting the groupings of sensors and/or parameters that correspond to the plurality of portions of the aircraft type comprises:

providing, by the computing system, by way of a user interface, a schematic view of the aircraft type;

receiving a selection, by way of the user interface, of a portion of the schematic view that corresponds to a portion of the aircraft type;

providing, by way of the user interface, selectable sensors and parameters associated with the portion of the schematic view;

receiving, by way of the user interface, a selection of one or more of the selectable sensors and parameters; and determining a given grouping of sensors and parameters based on receiving the selection of one or more of the selectable sensors and parameters.

6. The method of claim 1, wherein determining the values of additional operational metrics comprises:

determining, based on comparing the values for the predetermined operational metrics, overall maximum values, overall minimum values, and average values corresponding to the values for the predetermined operational metrics, wherein the additional operational metrics include the overall maximum values, the overall minimum values, and the average values.

7. The method of claim 6, wherein training the machine learning model using at least the values for the additional operational metrics comprises providing the overall minimum values, the overall maximum values, and the average values as inputs to the machine learning model.

8. The method of claim 1, further comprising:

prior to training the machine learning model using at least the values for the additional operational metrics, accumulating values for the additional operational metrics that correspond to a plurality of aircraft of the aircraft type until the values for the additional operational metrics correspond to a threshold number of aircraft of the aircraft type; and after determining that the values for the additional operational metrics correspond to the threshold number of aircraft of the aircraft type, training the machine learning model using the accumulated values for the additional operational metrics.

9. The method of claim 1, further comprising:

determining simulated values for the additional operational metrics for each grouping of the plurality of groupings, based on known aerodynamic qualities of respective portions of the aircraft type that correspond to each respective grouping; and prior to training the machine learning model using at least the values for the additional operational metrics, training the machine learning model using the simulated values for the additional operational metrics.

10. The method of claim 1, wherein training the machine learning model comprises training two or more distinct machine learning models using at least the values for the additional operational metrics, the method further comprising:

comparing, by the computing system, outputs of the two or more distinct machine learning models, wherein providing the instruction to perform maintenance on one or more of the plurality of portions of the aircraft or another aircraft of the aircraft type comprises providing the instruction to perform maintenance based on comparing the outputs of the two or more distinct machine learning models.

11. The method of claim 1, further comprising:

prior to training the machine learning model using at least the values for the additional operational metrics, training the machine learning model using values for additional operational metrics that correspond to other aircraft of the aircraft type.

12. The method of claim 1, wherein providing the instruction to perform maintenance on one or more of the plurality of portions of the aircraft or another aircraft of the aircraft type comprises:

receiving the output of the machine learning model, wherein the output comprises a performance rating of each portion of the aircraft that corresponds to a selected grouping of sensors and/or parameters;

determining that a performance rating of one or more portions of the aircraft falls below a performance rating threshold; and providing the instruction to perform maintenance on the one or more portions.

13. A system for determining whether to perform aircraft maintenance comprising:

a computing device having a processor and memory storing instructions executable by the processor to:

select, from a plurality of sensors and parameters associated with an aircraft type, based on expected in-flight forces to be experienced by a plurality of operationally distinct portions of the aircraft type, a plurality of groupings of sensors and/or parameters that correspond to the plurality of portions of the aircraft type;

receive, from an aircraft of the aircraft type, feature data that corresponds to each grouping of sensors and/or parameters;

determine, from the feature data, values for predetermined operational metrics that correspond to the plurality of groupings of sensors and/or parameters, wherein the values for the predetermined operational metrics are indicative of responses of the aircraft to forces experienced by each respective portion of the aircraft that corresponds to a selected grouping of sensors and/or parameters during a given flight of the aircraft;

compare the values for the predetermined operational metrics to values for the predetermined operational metrics that correspond to at least one other flight of the aircraft;

determine based on comparing the values for the predetermined operational metrics, values of additional operational metrics, wherein the values of the additional operational metrics are indicative of responses of the aircraft to forces experienced by each respective portion of the aircraft that corresponds to a selected grouping of sensors and/or parameters during multiple flights of the aircraft;

train a machine learning model using at least the values for the additional operational metrics; and provide, based on an output of the machine learning model, an instruction to perform maintenance on one or more of the plurality of portions of the aircraft or another aircraft of the aircraft type.

14. The system of claim 13, wherein the computing device further comprises a user interface, and wherein the instructions are further executable by the processor to provide, by way of the user interface, suggested sensors and parameters for the groupings associated with portions of the aircraft type.

15. The system of claim 13, wherein the computing device further comprises a user interface, and wherein selecting the plurality of groupings of sensors and parameters comprises receiving indications of the groupings by way of the user interface.

16. The system of claim 13, further comprising a database, wherein selecting the groupings of sensors and/or parameters that correspond to the plurality of portions of the aircraft type comprises:
receiving, from the database, simulation and/or test data corresponding to the expected in-flight forces to be experienced by the plurality of operationally distinct portions of the aircraft type;
determining, based on receiving the simulation and/or test data, known sensors and/or parameters of the aircraft type that relate to the expected in-flight forces; and
selecting the groupings of sensors and/or parameters that correspond to the plurality of portions of the aircraft type based on determining the known sensors and/or parameters of the aircraft type that relate to the expected in-flight forces.

17. The system of claim 13, further comprising a database, wherein the instructions are further executable by the processor to:
receive the feature data;
transmit the feature data to the database; and
transmit, with the feature data, an aircraft identifier associated with a particular aircraft that corresponds to the feature data, to the database.

18. The system of claim 13, further comprising a server associated with the machine learning model, wherein the server is configured to receive inputs from the computing device to train the machine learning model, and wherein the instructions are further executable by the processor to:
determine simulated values for the additional operational metrics for each grouping of the plurality of groupings, based on known aerodynamic qualities of respective portions of the aircraft type that correspond to each respective grouping; and
prior to training the machine learning model using at least the values for the additional operational metrics, train the machine learning model using the simulated values for the additional operational metrics.

19. The system of claim 13, further comprising an aircraft maintenance controller associated with an aircraft maintenance facility, wherein providing the instruction to perform maintenance on one or more of the plurality of portions of the aircraft comprises transmitting the instruction to the aircraft maintenance controller.

20. A non-transitory computer readable medium having stored thereon instructions, that when executed by one or more processors of a computing device, cause the computing device to perform functions comprising:
selecting, from a plurality of sensors and parameters associated with an aircraft type, based on expected in-flight forces to be experienced by a plurality of operationally distinct portions of the aircraft type, a plurality of groupings of sensors and/or parameters that correspond to the plurality of portions of the aircraft type;
receiving, from an aircraft of the aircraft type, feature data that corresponds to each grouping of sensors and/or parameters;
determining, from the feature data, values for predetermined operational metrics that correspond to the plurality of groupings of sensors and/or parameters, wherein the values for the predetermined operational metrics are indicative of responses of the aircraft to forces experienced by each respective portion of the aircraft that corresponds to a selected grouping of sensors and/or parameters during a given flight of the aircraft;
comparing, the values for the predetermined operational metrics to values for the predetermined operational metrics that correspond to at least one other flight of the aircraft;
determining, based on comparing the values for the predetermined operational metrics, values of additional operational metrics, wherein the values of the additional operational metrics are indicative of responses of the aircraft to forces experienced by each respective portion of the aircraft that corresponds to a selected grouping of sensors and/or parameters during multiple flights of the aircraft;
training a machine learning model using at least the values for the additional operational metrics; and
providing, based on an output of the machine learning model, an instruction to perform maintenance on one or more of the plurality of portions of the aircraft or another aircraft of the aircraft type.

* * * * *